Figure 1:
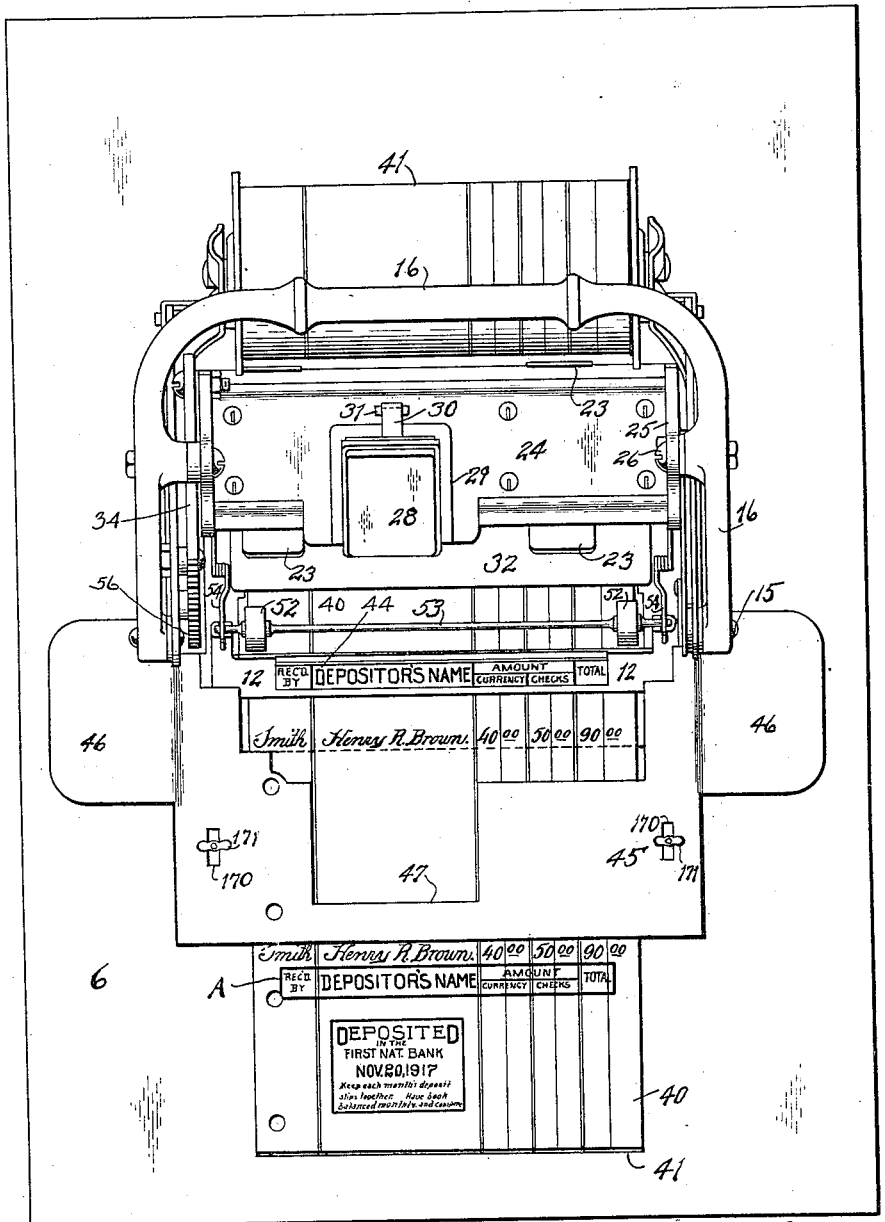

W. L. DEMING.
CASH RECORDING DEVICE.
APPLICATION FILED DEC. 23, 1918.

1,375,490.

Patented Apr. 19, 1921.
8 SHEETS—SHEET 1.

Inventor
William L. Deming,
By Bates & Macklin
Attys.

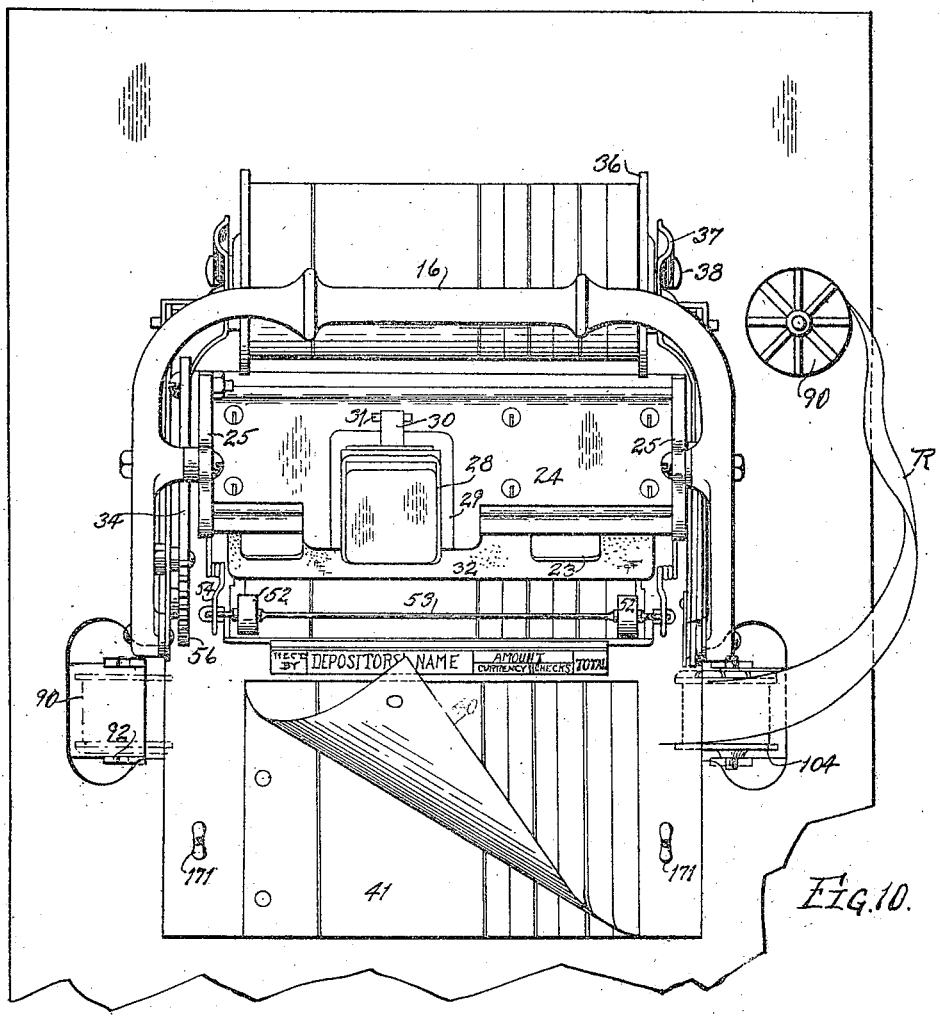

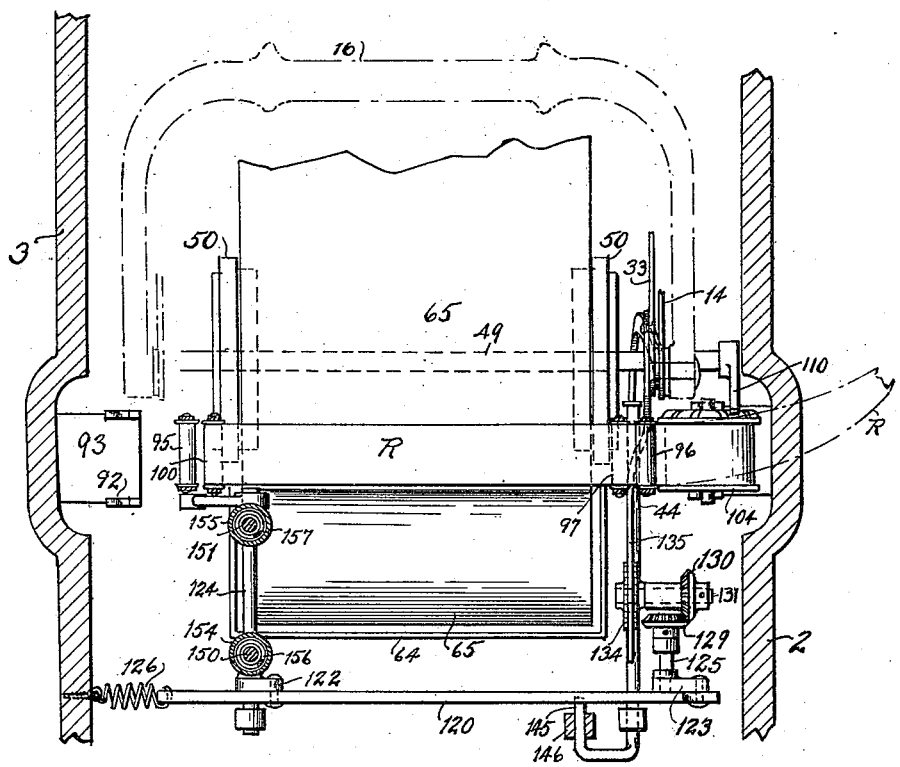

W. L. DEMING.
CASH RECORDING DEVICE.
APPLICATION FILED DEC. 23, 1918.
1,375,490.
Patented Apr. 19, 1921.
8 SHEETS—SHEET 8.
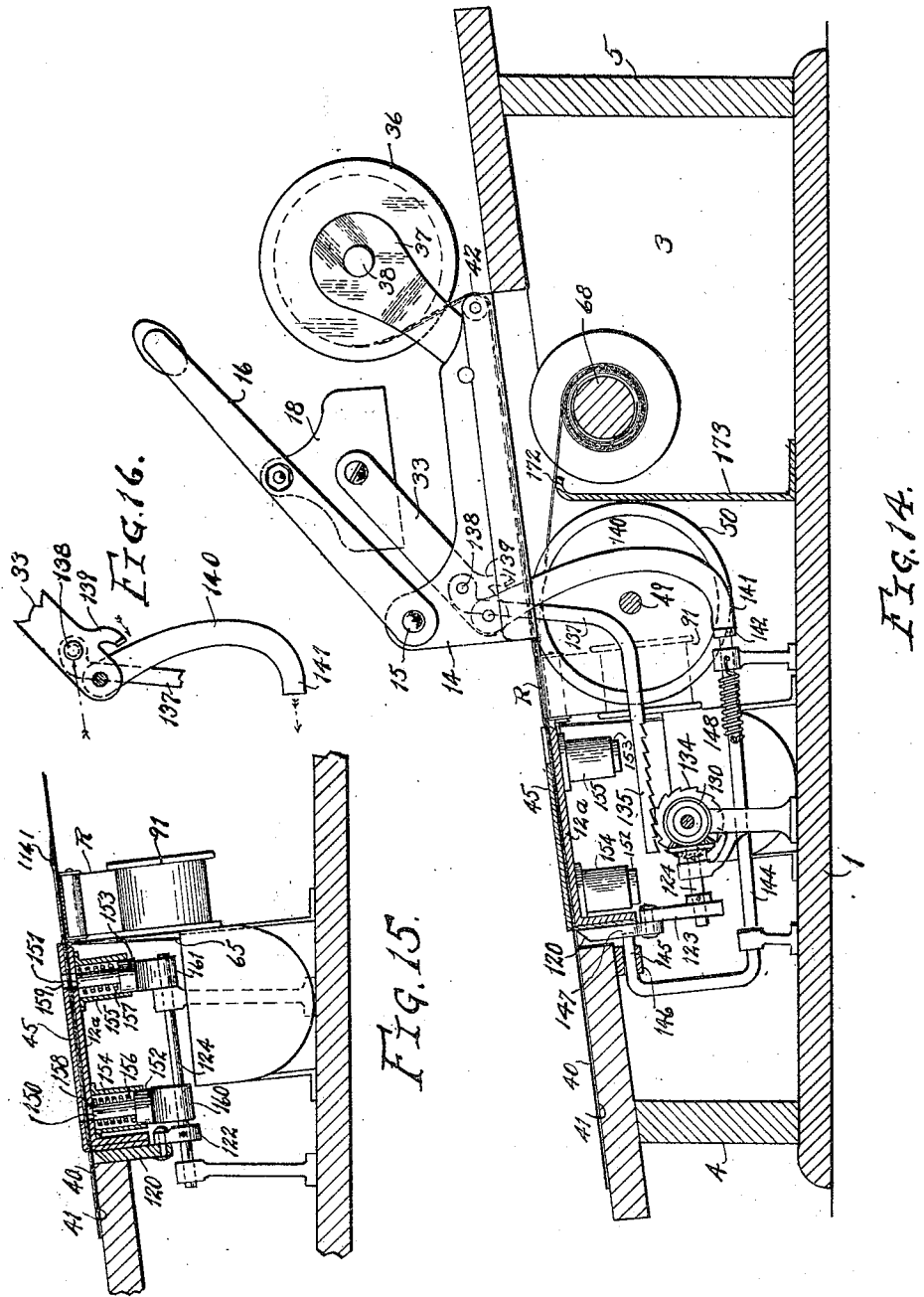

UNITED STATES PATENT OFFICE.

WILLIAM L. DEMING, OF SALEM, OHIO.

CASH-RECORDING DEVICE.

1,375,490.  Specification of Letters Patent.  Patented Apr. 19, 1921.

Application filed December 23, 1918. Serial No. 268,029.

*To all whom it may concern:*

Be it known that I, WILLIAM L. DEMING, residing at Salem, in the county of Columbiana and State of Ohio, have invented a certain new and useful Improvement in Cash-Recording Devices, of which the following is a full, clear, and exact description, reference being had to the accompanying drawings.

This invention relates to devices for recording sales or similar transactions and is of that general type wherein the transaction is noted in writing on a suitable record strip. In the use of these recording devices of a form, such for example as shown described and claimed in my prior application No. 129,325, filed November 3, 1916, it has been found desirable to provide two strips of paper to receive the notation of the transaction, one receiving a written and stamped notation directly and the other the written notation through a carbon strip. Portions of these two strips are severed and the one handed to the customer as a receipt, the other being retained by the house, while still a third strip receives the written notations by an impression of transferable pigment. This latter strip is retained in the recording device as a check against the severed receipts. Accordingly an object of the invention is to provide a simple, effective arrangement of carbon ribbon adapted to be fed transversely of the record strips between the first and second, and second and third, respectively. A more specific object is to so arrange a single carbon ribbon that it may pass between the first and second strips and return between the second and third and yet be so arranged that the two upper strips and stamp operating portion of the device may be removed to allow access to the permanent record strips or "house" record. Still another object is to so construct the device that the receipt portions having received the notation may be automatically fed forwardly and severed consequent upon the actuation of a stamping device. In the machine shown in the application mentioned, a roll is provided from which one record strip is fed forwardly across a writing support, and beneath a protecting cover having a writing opening, and after each notation the actuation of a stamp movably carried by the device stamps the strip beneath the notation, and upon the return of the stamp feeds the strips forwardly so that the portion bearing the notation may be severed and handed to the customer as a receipt. In certain forms of commercial transaction, such for example, as that used in recording deposits in small banks, such a device may be conveniently used. Where it is desirable that there be a substantial duplicate of the receipt handed to the customer, to be kept by the house or institution as a check against the record inclosed within the device, two strips of paper having duplicate ruling are wound on the one record strip roll and the notations are written directly on the upper one of such strips and transmitted by a carbon ribbon to the two strips beneath.

Still another object in the use of such a device is to provide for automatically punching openings in the receipts severed from the duplicate record strips so that they may be placed in a loose leaf holder having devices engaging the openings. A specific object is to so arrange such a mechanism that it may be automatically operated consequent upon the actuation of the stamp and may not interfere with the feeding of any of the record strips. With the above and other objects in view I have shown a preferred form of my invention in the accompanying drawings. The foregoing and other objects will become apparent in the following specification, referring to the drawings, and the essential characteristics are summarized in the claims.

Figure 2:
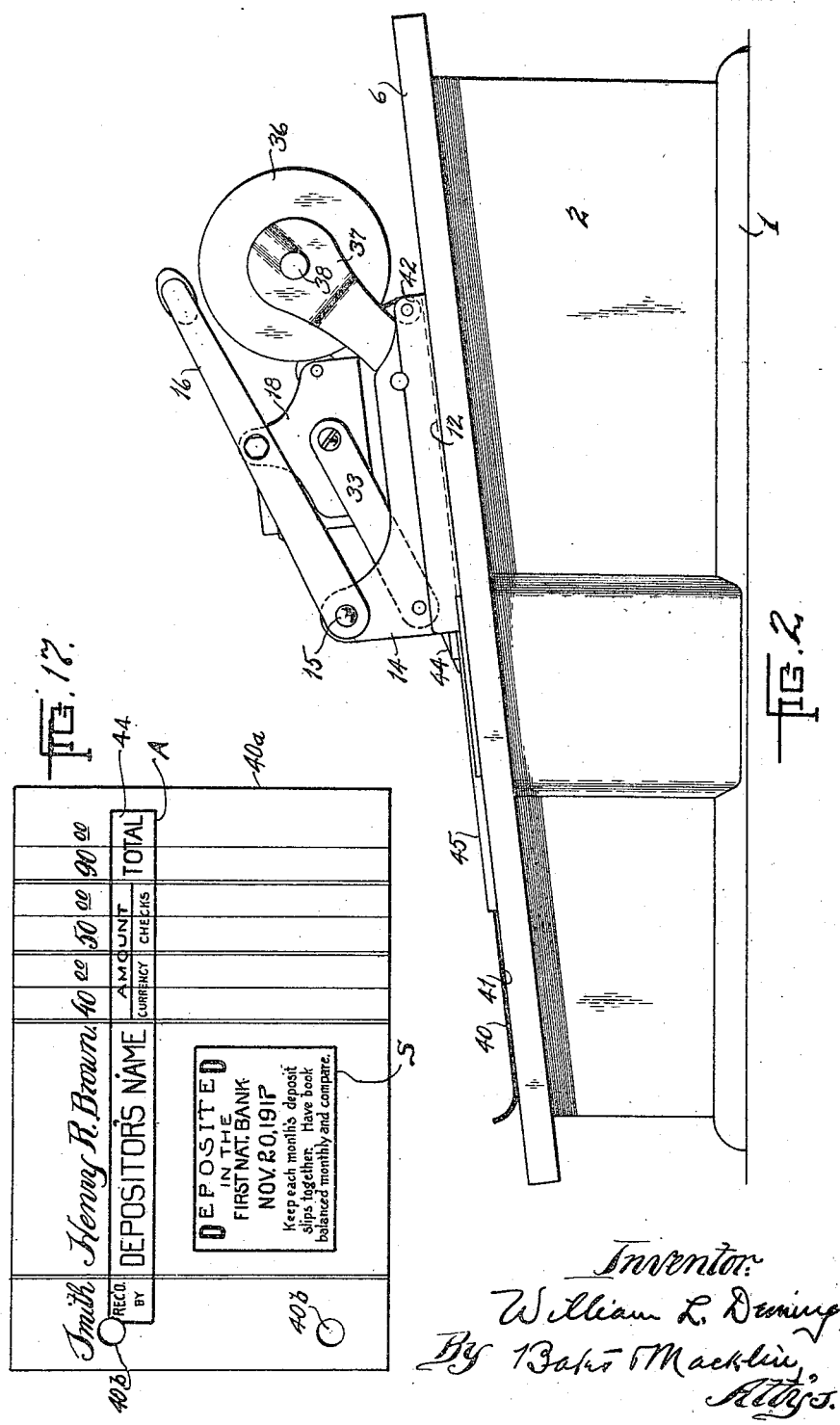
Figure 3:
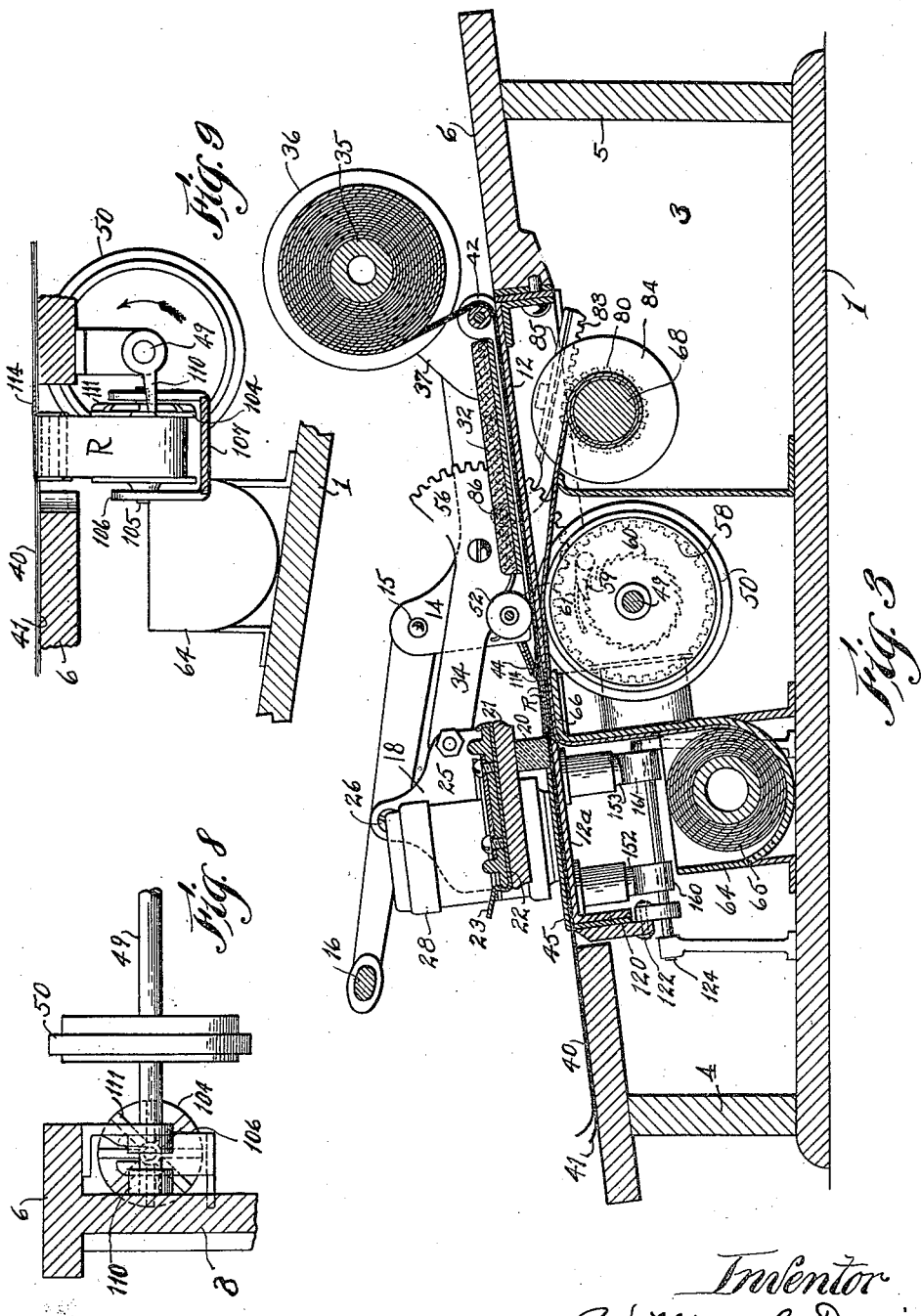
Figure 4:
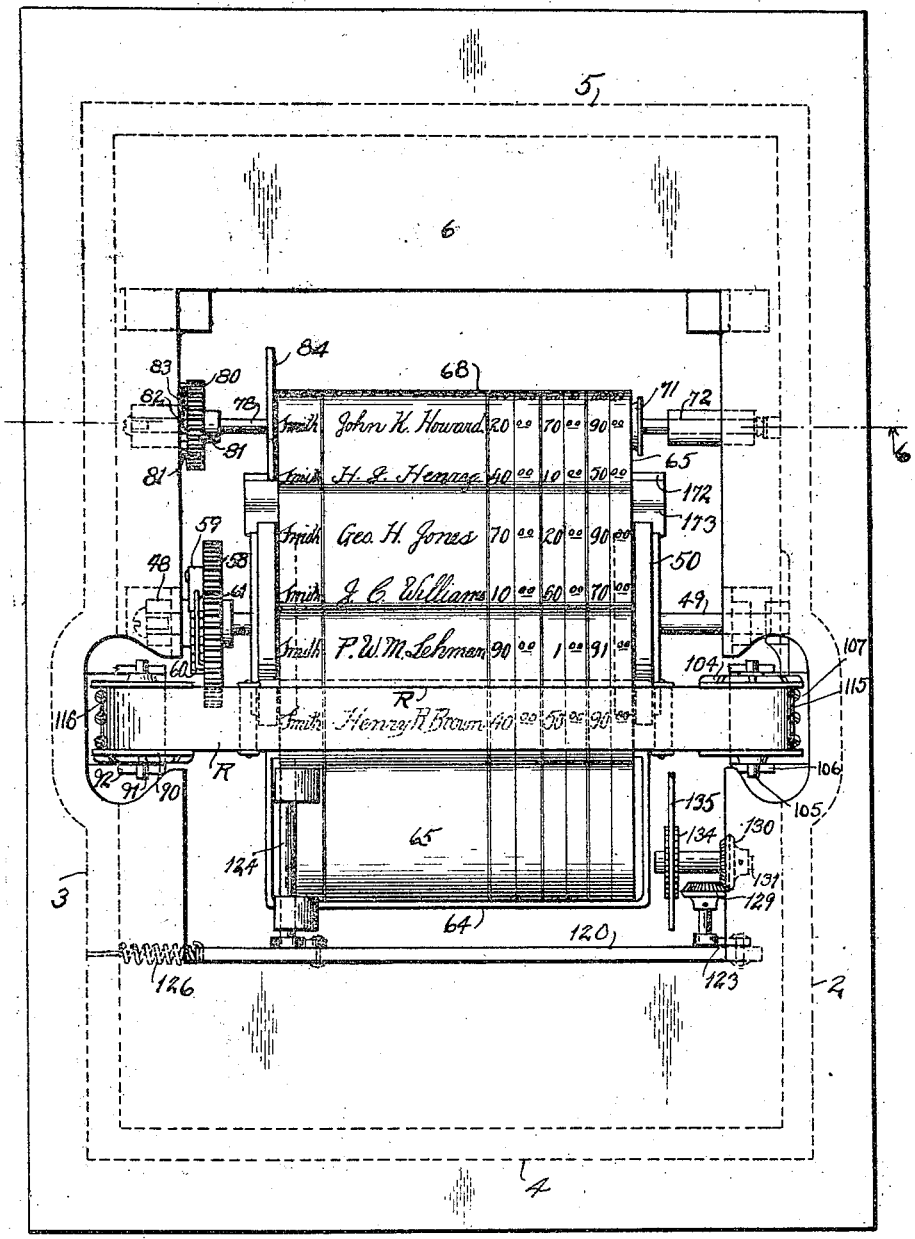
Figure 5:
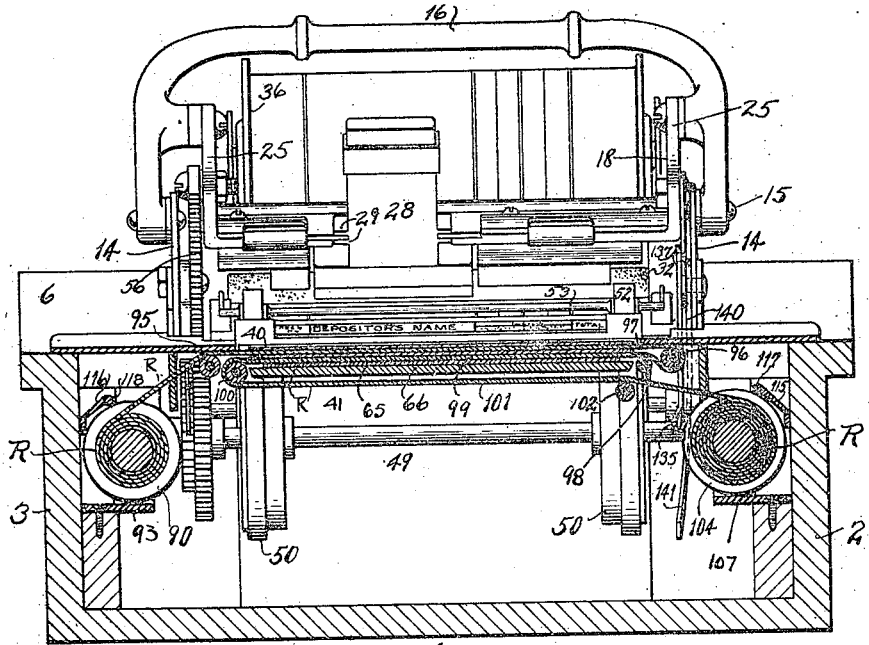
Figure 6:
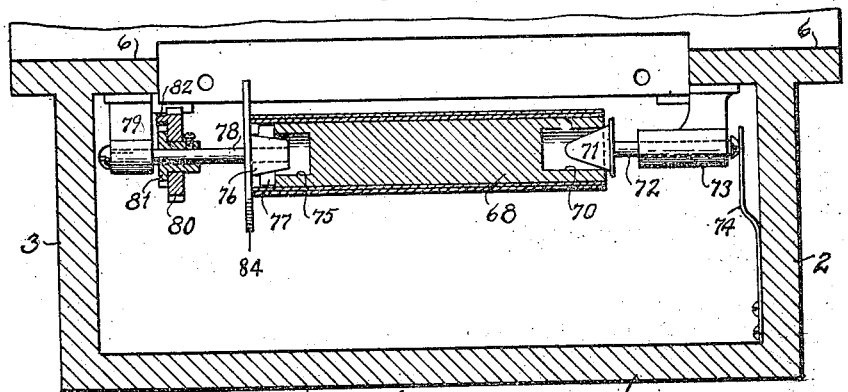
Figure 7:
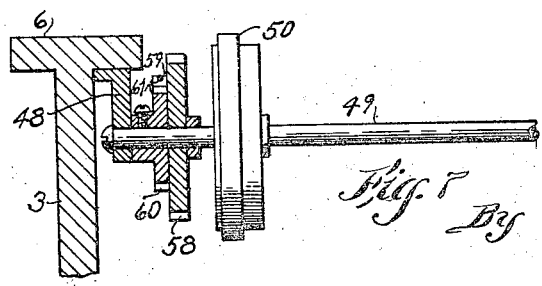

In the drawings, Figure 1 is a plan of my cash recording device showing the receipts about to be severed; Fig. 2 is a side elevation of the same; Fig. 3 is a vertical longitudinal section through the device showing the stamp in an operating position; Fig. 4 is a plan of the base of the device with the stamp carrying and operating mechanism and the record strip roll removed, showing particularly the permanent or "house" record and the relative position of the carbon ribbon; Fig. 5 is a transverse section through the device taken through the carbon ribbon and several record strips; Fig. 6 is a transverse sectional detail of one of the rollers for feeding the receipt strips and the driving gears therefor; Fig. 7 is an elevation of one of the feed rolls showing in section the gearing for rotating it; Fig. 8 is a view of the other such feed roll in a direction opposite to that of Fig. 7 showing the device for progressing the carbon ribbon; Fig. 9 is a longitudinal sectional detail on a plane parallel to Fig. 3, showing this ribbon progressing device; Fig. 10 is a plan view similar to Fig. 1 showing the guard plate removed and illustrating the method of removing the upper reach of the ribbon from the first and second strips to allow removal of the second record strip and the stamp carrying mechanism; Fig. 11 is a detail of the guard plate removed; Fig. 12 is an irregular sectional plan of parts within the casing, showing particularly the punching and cutting mechanism; Fig. 13 is a section on a plane parallel to plane of Fig. 5, taken at the forward portion of the casing and showing a record strip severing device; Fig. 14 is a longitudinal section substantially parallel with Fig. 2, and showing particularly the operating mechanism for the severing knife and punches; Fig. 15 is a fragmentary section parallel to Fig. 14, illustrating the construction of the punches; Fig. 16 is a sectional detail of a part of the knife tripping mechanism showing the connection with the stamp carrying means. Fig. 17 shows on an enlarged scale one of the record receipts to be handed to the customer.

Describing the parts by the use of reference characters, I provide a box or casing of wood or other suitable material having a bottom 1, side walls 2 and 3, vertical end walls 4 and 5, and a top support 6. On the support 6 and over a large opening therein, is mounted a flat metal plate 12 having upwardly turned integral side portions 14 providing pivotal bearings 15 for a swinging bail shaped lever 16, pivotally carrying a stamp support 18, to the under side of which is preferably removably secured a rubber stamp indicated at 20. As shown this stamp is secured to the under side of the block 21 carried by a spring plate 22 (Fig. 3) having spring fingers 23, embracing the transverse body of the support 18. This stamp carrier is shown as comprising a transverse bridge portion embraced by the fingers 23 and to which the plate 22 is fitted, and is provided with upwardly turned ends 25 pivoted at 26 to the side arms of the actuating lever 16. The stamp 20 is preferably adapted to print a receipt on a ruled strip and at the same time to print certain legends as indicated at A, Figs. 1 and 17. The receipting stamp is preferably of a character adapted to print within a rectangular border a changeable date and accompanying explanations. Such a stamp is indicated as comprising a rectangular casing 28 supported by the transverse member 24, of the stamp carrier, by laterally extending flanges 29 adapted to engage the metal of the carrier at each side of a rectangular notch, slidably embracing three sides of the casing, while a spring latch 30 is shown as adapted to engage a notch 31 in the upper surface of the plate 24 to hold this stamp in position while allowing it to be readily removed.

At 32 is shown a suitable inking pad horizontally disposed above the plate 12 and supported at its ends, the stamp being adapted to rest normally on this pad.

Arms 33 and 34 comprise means for maintaining the printing surfaces of the stamp in a position parallel to the support 6 and to the receiving surface of the record strips at all times. Each of these arms is pivoted at one end to the side members 25 of the stamp carrier and at the opposite end to the side members 14. For purposes of rigidity, the arm 33 has its pivot points arranged substantially vertically beneath the pivot points of the bail, while the pivot points of the arm 34 are arranged in a laterally disposed relation to the pivots 15 and 26, as shown particularly in Fig. 3.

As indicated at 35 I have shown a roller having large flanges 36 at its ends carried on bearing arms 37 extending upwardly and rearwardly from the side wings 14 of the plate 12, and embracing trunnions 38 at the ends of the roller. The paper strips 40 and 41 are carried on this roller and comprise the customer's record strip and the duplicate receipt strip and when in operation pass downwardly from the roller 35, beneath a wide roller 42, forwardly beneath the stamp pad 32 and across the plate 12 to a point where they may be written upon. Above the plate 12 is shown a transverse metal strip 44 bearing legends alined with the columns of the record strip and forming headings therefor. Forward of this metal strip or bridge is a second bridge member or cover plate 45 having laterally extending ears 46 resting upon the support 6 and intermediately cut away to clear the upwardly extending side portions 14 while the intermediate portion of this cover plate is raised slightly to extend across and clear the record strips allowing them to travel freely beneath this plate. The intermediate cut-away portions are provided to expose only limited areas of the record strips for writing a transverse line and for receiving the receipting stamp and still further cut away as at 47 for the dating stamp.

Beneath the support 6 and carried by suitable brackets 48 is a shaft 49 on which are rigidly mounted separate wheels 50, each provided with rubber on the periphery and extending upwardly through openings in the plate 12. These rollers press against small coacting rollers 52 mounted on a small shaft 53 resting in upwardly opening bearings rising from the plate 12, whereby the shaft may be urged downwardly thus pinching the edges of the record strips 40 and 41 between the rollers 52 and 50 so that the rotation of the rollers 50 may effect the feeding of the strips 40 and 41. To cause such feeding consequent upon the movement of the stamp and in proper relation thereto, I have shown a segmental extension 56 on the end of the arm 34 having gear teeth which mesh with a gear 58 rotatably mounted on a shaft 49 and adapted to cause the rotation of this shaft through a dog 59 pivoted to the gear 58 and engaging a ratchet wheel 60, rigid with the shaft, the pawl being urged into engagement with the ratchet wheel by a spring 61. Thus, as the stamp is oscillated, the segmental gear rotates the gear 58 in a direction such that the pawl passes idly over the teeth of the ratchet wheel, while the stamp is being moved from the stamp pad to the receipt. On the return movement of the stamp, the gear 59 through the ratchet and pawl, actuates the shaft 49 in a direction to rotate the rollers 50 forwardly, a peripheral distance corresponding to the length (top to bottom) of the receipt.

At 64 is shown a transverse trough, receiving a loose record roll 65, one side of which trough passes upwardly and over the bridge 66 and rearwardly between the raised rubber portions of the wheels 50 to a roller 68 onto which this permanent record strip is wound. The roller 68 is in the nature of a removable spool having a recess at one end indicated at 70 adapted to receive a conical bearing 71 (Fig. 6) on the end of a stub shaft 72 carried in a bearing bracket 73 suspended from the member 6 and urged into engagement with the edge of the recess 70. At the other end of this spool is a recess 75 adapted to receive a conical bearing member 76, which is provided with laterally extending ears 77 fitting enlargements in the recess, and which is mounted on a stub shaft 78 carried in the bearing bracket 79, also carried on the support 6. The shaft 78 is rotated by a gear 80, shown as loosely journaled about the hub of a ratchet wheel 81 rigidly secured to the shaft 78 and adapted to be engaged by a pawl 82 (Fig. 4) pivoted to the face of the gear 80 and urged into engagement with the ratchet wheel by a suitable spring 83. Next to the conical head is a suitable flange 84 adapted to guide the record strip 65.

The gear 80 is rotated in a direction to advance the record strip rearwardly by an arm 85 pivoted at 86 to the outer face of the segment 56 and having teeth 88 on its under side engaging the teeth of the gear 80. It will be noted that as the stamp moves rearwardly the gear 80 is rotated in an idle direction and when the stamp is moved forwardly, this gear and ratchet through the connections described, are caused to actuate the spool 68 to wind the record strip 65 thereon, moving it a distance substantially the width of the writing space.

The notations written on the exposed strip just beneath the legend bar 44 and over the bridge 66 are transferred by means of a carbon ribbon to the lower receipt strip and to the record strip 65. This carbon is illustrated at R as extending transversely of the strips at the writing opening from a spool indicated at 90 shown as having trunnions 91 carried in open bearings 92 of a suitable bracket secured to a block 93 on the side wall 3. From the spool 90, the carbon ribbon passes upwardly over a roller 95 and then horizontally between the first and second strips to a roller 96 forming the upper reach 97 of the carbon ribbon. The carbon ribbon is brought around the roller 96 and upwardly to a point adjacent to the reach 97 by a guide roller 98, and thence it extends transversely (at 99) between the lower receipt strip and the record strip 65 to a guide roller 100, and again passes substantially horizontally, as at 101, over a guide roller 102 to a spool 104 onto which the carbon ribbon is wound. This spool is similar to the spool 90, being provided with trunnions 105 resting in upwardly opening bearings 106 of a bracket 107 secured to the side frame member 2.

The ribbon is advanced to present fresh surfaces to the writing space by a finger 110 (Fig. 8) on the shaft 49 engaging radial ribs 111 integral with the side flange of the spool 104. As this finger moves past the spool in the direction of the arrow, (Fig. 9) it engages one of these ribs and sliding along the same as it revolves rotates the spool a short distance, and upon the next revolution engages the next rib until the ribbon on the spool 91 is exhausted, whereupon the spools are simply interchanged, rethreading the ribbon between the record strips. The ribbon then travels in the same direction but from the spool 104 to the spool 90 rewinding the ribbon onto the latter spool.

To prevent the receipt record strips from tearing the ribbon by reason of adhering together, I have shown a separator blade, particularly in Fig. 9 at 114, which is secured to the plate 12, and raised slightly above the plate to clear the lower record strip 41, allowing it to pass beneath the separator blade. At 115 and 116 are indicated leaf springs secured to the side walls 2 and 3 extending over the spools 90 and 104, and each having a transverse bar 117 and 118 respectively, bearing on the flanges of the spools to prevent inadvertent rotation and to keep the ribbon taut.

The device for automatically severing the receipts as they are presented, forwardly of the cover 45, is indicated in Figs. 3 and 14, as comprising a knife 120 operating through the opening of the support 6 and coacting with the forward edge of the cover 45 to shear these strips along such edge. This knife is mounted on rocker arms 122 and 123 (Fig. 13) and pivotally secured thereto while these rocker arms are rigidly secured to shafts 124 and 125 respectively. Thus the knife extends transversely of the record strip substantially at right angles to the length thereof and is actuated to cause the cutting action by a spring 126 secured to the knife and the side wall 3 (Figs. 12 and 13).

To withdraw the knife and allow its release at the proper time, I have shown the following mechanism: Mounted on the shaft 125 is a bevel gear 129 coacting with the bevel gear 130 on the shaft 131 substantially at right angles to the shaft 125, and having suitable bearing supports carried by the base 1. On the shaft 131 is also a ratchet wheel 134 rigidly secured to the shaft and adapted to be actuated by a toothed rack 135 formed on the under side of a pivoted arm extending rearwardly and then upwardly, as at 137, and pivoted to the arm 33 at 138.

On the pivot for the arm 33 is a downwardly extending trip lever 140 which is off-set or curved to clear the shaft 49 and which is led forwardly, as at 141, to engage a head 142 on a slidable rod 144 supported in bearings carried by the base 1. This rod is bent upwardly and then rearwardly as at 145 and projects through a guide 146 to engage a recess 147 in the knife 120. This locks the knife in its inactive position against the tension of the spring 126 so that a slight forward movement of the rod 144 releases the latch and allows the spring to actuate the knife, while a spring 148 around the rod 144 acts under tension to draw the rod rearwardly toward the actuating member 141 to accomplish the relatching. Thus when the stamp is moved forwardly the toothed member 135 actuates the ratchet 134 which revolves the gear 130 in a direction to rotate the gear 129, the shaft 125 and arm 123 to pull the knife downwardly slightly out of the path of the record strips, where it is latched by the extension 145 of the rod 144.

The forward movement of the lever 140 to cause the unlatching and actuation of the knife may be accomplished by any suitable connection between the swinging stamp carrying members and this lever. For example, I have shown an offset finger 139 integral with the arm 33 and adapted to engage the upper portion of the lever 140 below its pivot on the rearward movement of the stamp just before the stamp reaches its pad 32, (Figs. 14 and 16). As this unlatching movement is very slight the unlatching may be accomplished just as the feeding of the receipt strips forwardly is completed. In practice the finger 139 does not engage the lever 140 until the stamp is within a very short distance of its pad, which would be a position even lower than that shown in Fig. 14. The completing of the return movement of the stamp, from the position shown in Fig. 14, brings the finger 139 into engagement with the lever 140 which is thereby moved, moving the rod 144 and extension 145, so that this extension is disengaged from the knife just as the stamp reaches the pad, which is the moment when the receipt strips have completed their forward movement and present their full length (top to bottom) forwardly of the knife to be severed.

As previously stated it is desirable to punch openings in the receipts so that they may be secured in a suitable "loose leaf" holder. Such openings are illustrated at 40$^b$ in Fig. 17 at the left margin of the receipt strip 40$^a$, shown also in Fig. 17. It is desirable to accomplish the punching of these openings automatically and accordingly I have provided, in connection with the severing mechanism, punches, shown particularly in Figs. 12 and 15, as mounted on an extension 12$^a$ of the plate 12 in position forwardly of the carbon ribbon. These punches, indicated at 150 and 151, are shown as having enlarged heads 152 and 153, respectively, guided in cylindrical casings 154 and 155 attached to the under side of the plate 12$^a$. In these casings are suitable springs 156 and 157 bearing against the under side of the plate and against the heads to hold the punches normally below the path of the record strips 40 and 41, whereby they may be urged forwardly through registering openings 158 and 159 in the plates 12$^a$ and 45 and through the record strips to make the openings 40$^b$.

To actuate the punches I have shown cams 160 and 161 respectively on the shaft 124 which are so shaped that when the knife 120 is drawn to its inactive position the springs urge the punches downwardly out of the path of the receipt strips; and when the knife is actuated, to sever the receipt strips forwardly of the plate 45, these cams urge the punches upwardly to punch the strips.

A brief description of the operation of the entire device is as follows:

Assuming that the receipt strips are wound on the roller 35 threaded beneath the stamp pad 32 past the separator 114 over the bridge 66 and between the plates 12$^a$ and 45, while the permanent record strip is led from the roll 65 over this bridge 66 and attached to the roller 68 ready to be wound on the latter roll, and the carbon ribbon having been properly positioned between these strips, the device is ready for operation. If my device is being used in a small bank, for example, when a customer desires to make a deposit, the receiving clerk using a pencil notes in the left hand column of the record strip, by writing over the bridge 66, his designation or name, "Smith," for example;—in the next column, for example, the depositor's name "Henry R. Brown;" currency deposited "$40.00" in the next column; checks "$50.00" in the next column to the right; and in the last column to the right the total of this amount "$90.00." He then grasps the bail 16, swings the stamp forwardly (toward himself) which prints the rectangular column heading with its legends on the receipt strip, as indicated at A in Fig. 17 and at the same time dates the receipt within a rectangular border made by the stamp 28, as indicated at S on the receipt, there being within this border any suitable legend to indicate the name of the institution and suitable instructions to the depositor. The bail 16 is then swung rearwardly from the position shown in Fig. 3 to that shown in Fig. 2.

The forward movement of the stamp mechanism feeds the record strip 65 rearwardly by means of the ratchet mechanism, 81, 82, gear 80 and rack 88, to move the written notation on the permanent roll away from the writing opening so that it may not be tampered with after the stamping operation. On the forward movement of the stamp carrying mechanism the lever 137 causes the ratchet teeth of the rod 135 to rotate the ratchet 134, gear 130 and gear 129, swinging the rock shaft 125 in a direction to draw the knife downwardly out of the path of the receipt strips and into such position that the projection 145 enters the recess 147 under the influence of the spring 148.

During the return swinging movement the segmental gear 56 through the gear 58, ratchet mechanism 59 and 60, rotates the rollers 50 to feed the receipt strips forwardly from beneath the cover 45. As the stamp approaches its pad on its rearward movement the finger 139 of the arm 33 engages the lever 140, swings the same forwardly, releasing the knife latch and allowing the spring 126 to swing the knife laterally and upwardly, which severs the receipts, one of which may be handed to the customer and the other retained by the bank. During the rearward movement of the stamp-carrying mechanism and the rotation of the rollers 50, the finger 110 engages one of the radial ribs of the spool 104, winding a portion of the carbon ribbon onto this spool and advancing it along its path, thus progressively presenting a new surface to the writing opening.

The carbon ribbon preferably carries pigment on both sides so that the receipt strips and record strip may receive impressions therefrom, the receipt strips receiving an impression on both sides; that is, the upper receipt strip receives direct writing on the upper side and the carbon on the lower side, while the lower receipt strip receives a carbon impression on both sides, and the record receipt strip 65 a carbon impression on its upper side.

To obtain access to the mechanism below the plate 12, I have made this plate and the stamp carrying mechanism removable. One difficulty here presents itself, however, namely, the upper reach of the carbon ribbon between the two record strips which are removed with the stamp carrying mechanism must not be in its normal position during such removal. To provide for the ready displacement of this ribbon I have made the cover plate 45 removable so that access may be had to the ribbon spool at the left to remove this spool and the upper reach of the carbon ribbon from between the receipt strips. By swinging clamping buttons 171 (Fig. 1) to a position in alinement with the slots 170 in the cover plate 45 this plate becomes unlatched and may be lifted off from the receipt strips. The ribbon spool at the left may then be grasped by the operator's fingers and lifted from its bearings 92, raising the upper record strip 40, as indicated in Fig. 10, whereupon the spool and ribbon may be laid to one side, as indicated in this figure, and the stamp carrying mechanism and receipt strips may be lifted from the support 6, exposing the parts beneath substantially as illustrated in Fig. 4.

At the end of the day it may be desired to check the notations on the record strip with the receipts retained by the bank, and this may be readily accomplished (when the stamp mechanism has been removed) by manually feeding the record strip forwardly to wind it onto the roll 65 until the last notation has passed a cutting edge 172 on an upright plate 173 rising from the base 1, Fig. 14. A knife blade or similar instrument may then be passed along this cutting edge to sever this strip and the roll 68 with this strip thereon removed by withdrawing the cone 71 (Fig. 6) from its recess in the end of this roll, and sliding the shaft 72 outwardly against the action of the leaf spring 74. A similar roller may then be placed in position, or the record strip may be removed from this same roller and the end of the fresh record strip reattached thereto, and the stamp mechanism replaced and suitably locked in position for continuance of the operation as before. The ribbon R is then replaced by lifting the upper receipt strip 40 to bring the carbon between the strips 40 and 41 and the spool 91 placed in position. The cover 45 is then placed over these strips and secured by turning the buttons 171 transversely of the slots 170.

Having thus described my invention, what I claim is:

1. In a recording device, the combination of means for receiving a record strip, a support therefor exposing a portion of the strip to receive a notation, means for advancing the strip, strip severing mechanism including a spring as actuating means therefor, and a device controlling the actuation of the severing mechanism consequent on the movement of the advancing mechanism.

2. In a recording device, the combination of means for receiving a record strip, a support therefor exposing a portion of the strip to receive a notation, means for advancing the strip, means for severing the strip consequent upon each advance thereof including a knife, a spring for actuating the knife, and means in connection with the strip advancing mechanism for moving the knife against the action of the spring.

3. In a recording device, the combination of means for receiving a record strip, a support therefor exposing a portion of the strip to receive a notation, means for advancing the strip thereof, means for severing the strip consequent upon each advance including a knife, a spring actuating the knife, means in connection with the strip advancing mechanism for moving the knife against the action of the spring, a latch for holding the knife against the spring tension, and means for releasing the latch consequent upon the completion of the advancing movement of the strip.

4. In a recording device, the combination of means for receiving a record strip, a support therefor exposing a portion of the strip to receive a notation, means for advancing the strip, and trigger released mechanism for severing the strip suddenly said mechanism being controlled by movement of the advancing means.

5. In a recording device, the combination of a record strip, means for superposing a second record strip, a transfer pigment ribbon between the strips whereby writing on the upper record strip will be automatically made on the lower strip, means for feeding said strips to retain one in the device and feed a portion of the other out of it, means whereby actuation of said feeding means progresses said ribbon and means controlled by the feeding means for automatically severing the writing bearing portion of the upper strip.

6. In a device of the character described, the combination of a writing support, a permanent record strip retained in the device, means for superposing a second record strip, and means for progressing said strips in opposite directions over the writing support.

7. In a device of the character described, the combination of a record strip, a casing therefor having an opening exposing a part of the strip to receive writing, means for superposing a second record strip, means for advancing the strips to carry the written portion away from the writing opening and deliver a portion of one of the strips from the casing, and means including a knife actuated by a spring for causing the sudden severing of such delivered portion consequent upon the advancing movement.

8. In a device of the character described, the combination of a writing support, a record strip, a casing therefor having an opening exposing a part of the strip to receive writing, means for superposing a second record strip, a transfer pigment to transfer writing from one strip to the other, means for advancing the strips in opposite directions to carry the written portion away from the writing opening and deliver the written portion of the one strip from the casing, a knife for cutting off such delivered portion consequent upon the completion of the advancing movement.

9. In a recording device, the combination of means for receiving a supply roll for duplicate record strips, a guide, a writing support beneath the guide, a permanent record strip extending across said support beneath the duplicate strips, a carbon strip leading across said first mentioned strips between them and returning beneath said strips over the permanent record strip, a supply roll and a receiving roll for said carbon strip, means for progressing the carbon strip, a movable device carried by the support, means operated by the movement of said device to advance all of the strips, moving the written record away from the support and the record bearing portion of the upper strips to a position where they may be severed, a knife, and means actuating the knife to sever the strips.

10. In a recording device, the combination of means for receiving a supply roll for duplicate record strips, a guide, a writing support beneath the guide, a permanent record strip extending across said support beneath the duplicate strips, a carbon ribbon leading across said first mentioned strips between them and returning beneath said strips over the permanent record strip, a supply roll and a receiving roll for said ribbon, a movable device carried by the support and adapted to advance all of the strips moving the written record away from the support and the record bearing portion of the upper strips to a position where they may be severed, said means also advancing the ribbon.

11. In a recording device, the combination of means for receiving a supply roll for duplicate record strips, a guide, a writing support beneath the guide, a permanent record strip leading across said support beneath the first mentioned strips, a carbon ribbon extending transversely of the strips, a supply roll and a receiving roll at opposite sides of the strips respectively, and means for intermittently actuating the receiving roll to advance said ribbon when said record strips are advanced, and rollers adjacent to the edges of the record strips to guide the ribbon in a path first between the first mentioned strips and then beneath such strips over the permanent record strip.

12. In a recording device, the combination of means for receiving a supply roll for duplicate record strips, a guide, a writing support beneath the guide, a permanent record strip leading across said support beneath the first mentioned strips, a carbon ribbon extending transversely of the strips, a supply roll and a receiving roll at opposite sides of the strips respectively, and means for advancing said strips, said means intermittently actuating the receiving roll to advance said ribbon.

13. In a recording device, the combination of means for receiving a supply roll on which duplicate record strips are wound, a guide for the strips, a writing opening in the guide, a pigment carrying strip extending transversely of the record strips and between them and a separating knife in advance of the last named strip and between the record strips, and means for advancing the record strips.

14. In a recording device, the combination of means for receiving column ruled record strips and a supply roll on which they are wound, a guide for the strips, a writing opening beneath the guide, a pigment carrying strip extending transversely of the record strips and between them, and means for advancing the record strips across the writing opening, movement of such means intermittently progressing said pigment-carrying strip.

15. In a recording device, the combination of a casing, a permanent record strip within the casing, a receiving roll therefor, a writing support across which said strip is led, a removable cover for the support, said cover carrying duplicate record strips and a supply roll on which they are wound, said strips being led across the writing opening, a transversely extending carbon strip adapted to be fed between said last named strips, a protecting plate over a portion of said strips, removable securing means therefor, supply and receiving rolls for the carbon strip removably carried by the casing and rendered accessible by the removal of said protecting plate.

16. In a recording device, the combination of a casing, a permanent record strip within the casing, a receiving roll therefor, a writing support across which said strip is led, a removable cover member for the support, a reciprocating device carried thereby, means for carrying duplicate record strips and a supply roll on which they are wound by the removable cover member, said strips being led across the writing opening, a transversely extending carbon strip adapted to be fed between said last named strips, a protecting plate over a portion of said strips, removable securing means therefor, supply and receiving rolls for the carbon strip removably carried by the casing and rendered accessible by the removal of said plate, and means whereby movement of said reciprocating device in both directions moves said permanent and duplicate record strips alternately in opposite directions.

17. In a recording device, the combination of a casing, a removable support thereon allowing access to the casing carrying a supply roll having a plurality of record strips wound on said roll and adapted to be fed across the support simultaneously, a transfer ribbon extending between the strips, a supply and receiving roll therefor within the casing, a removable protecting plate over said strips and said last named rolls, and means for severing the strips at the forward edge of said plate, whereby when the plate is removed one of the rolls may be moved to withdraw the transfer ribbon from between the other strips allowing the removal of said support.

18. In a recording device, the combination of a casing, a removable support allowing access to the casing, a permanent record strip within the casing, a writing support across which said strip is led, means for carrying a supply roll by the support having duplicate record strips wound on said roll and adapted to be fed across the support simultaneously, a transfer ribbon extending between the strips, a supply and receiving roll therefor within the casing and a removable protecting plate over said strips and said last named rolls, whereby when the plate is removed one of the ribbon rolls may be moved to withdraw the ribbon from between the duplicate strips allowing the removal of said support.

19. In a recording device, the combination of a casing, a removable support allowing access to the casing, a permanent record strip within the casing, a writing support across which said strip is led, means for receiving duplicate record strips and a supply roll therefor carried by the removable support, a carbon ribbon supply and receiving spools therefor within the casing and guide rollers leading the ribbon between the duplicate strips and backwardly beneath said strips over the permanent record strip and then forwardly again to the receiving roll beneath the permanent record strip, said spools being assessible from above the casing, a cover plate over a portion of the record strips and having extensions preventing access to the spools when in position, means for removably securing the cover plate, and means for concomitantly advancing all of the record strips and the ribbon.

20. In a recording device, the combination of a casing, a removable support allowing access to the casing, a permanent record strip within the casing, a writing support across which said strip is led, means for receiving duplicate record strips and a supply roll therefor carried by the removable support, a reciprocating device carried by the removable support, a carbon ribbon, supply and receiving spools therefor within the casing and guide rollers leading the ribbon between the duplicate strips backwardly beneath said strips over the permanent record strip and then forwardly again to the receiving roll beneath the permanent record strip, said spools being accessible from above the casing, a cover plate over a portion of the record strips and having extensions preventing access to the spools when in position, means for removably securing the cover plate, and mechanism actuated by the movement of the reciprocating device for progressing the permanent and duplicate record strips varying amounts.

21. In a recording device, the combination of means for receiving a record strip, means for supporting the same with a portion thereof exposed to receive a notation, means for advancing the record strip to deliver a portion thereof from the support, and means for severing the portion thus delivered, comprising a movable knife extending transversely of the strips, a spring tending to move the knife into severing position, and means for drawing the knife against the action of the spring consequent upon the actuation of the strip advancing means.

22. In a recording device, the combination of means for receiving a record strip, means for supporting the same with a portion thereof exposed to receive a notation, means for advancing the record strip to deliver a portion thereof from the support, a knife extending transversely of the strips, means for moving the knife toward the strips and transversely thereof to effectively sever the same, a latch for holding the knife in inactive position, and means for releasing the latch consequent upon the completion of the advancing movement.

23. In a recording device, the combination of means for receiving a record strip, a support therefor exposing a portion of the strip to receive a notation, means for advancing the strip to deliver the notation bearing portion from the support, and means for severing the delivered portion, comprising a knife, rock arms carrying the knife normally in position out of the path of the strips, yielding means causing the knife to move on the rock arms to sever the strip, and means actuated by the strip advancing means and connected with one of the rock arms for withdrawing the knife from the path of the strips.

24. In a recording device, the combination of means for receiving a record strip, a support therefor, means for advancing the strip to deliver a portion thereof from the support, a knife for severing the delivered portion, rock arms pivotally connected to the knife at separated points, yielding means for moving the knife to cause it to cut the strip, a gear on one of the rock arms, a connection between said gear and strip advancing means to actuate the knife by swinging the rock arm.

25. In a recording device of the character described having a record strip, means for advancing the strip, the combination of a knife for severing the strip, rock arms carrying the knife normally out of the path of the strip, a gear connected with one of the rock arms, a spring for moving the knife in one direction, and a connection between the advancing means and the gear for moving the knife in the other direction.

26. A recording device having a record strip and advancing means characterized by having a knife for severing the strip, separated rock arms pivoted to the knife, rock shafts carrying the rock arms, a spring for actuating the knife in one direction, a gear and ratchet mechanism connected to one of the rock arms for actuating the knife in the other direction consequent upon the movement of the advancing means.

27. A recording device having a notation receiving record strip and advancing means therefor characterized by having a reciprocating knife for severing the strip, a rock arm and rock shaft serving to support the knife, a punching device for making an opening in the record strip, and a cam on the rock shaft for actuating the punching device consequent upon the movement of the knife.

28. In a recording device, the combination of means for receiving a record strip, a support therefor exposing a portion of the strip to receive a notation, means for advancing the strip to deliver a portion thereof from the support, a reciprocating knife for severing the delivered portion, a ratchet and gearing connecting the reciprocating knife with the advancing mechanism, a device for punching an opening in the strip while on the support, including a rock shaft supporting the knife and cam on the rock shaft.

29. In a recording device, the combination of means for receiving a record strip, a support therefor exposing a portion of the strip to receive a notation, means for advancing the strip, means for cutting the strip including a reciprocating knife, a rock arm and rock shaft supporting the knife, separated plungers carried by the support adapted to be actuated to punch the strip, a cam on the rock shaft for each plunger, a ratchet and gear mechanism actuated by the advancing means to move the knife and cam in one direction, and yielding means for moving them in the other direction.

30. In a recording device, the combination of means for receiving a record strip, a support therefor exposing a portion of the strip to receive a notation, means for advancing the strip, means for cutting the strip including a reciprocating knife, a rock arm and rock shaft supporting the knife, separated plungers carried by the support adapted to be actuated to punch the strip, a cam on the rock shaft for each plunger, a ratchet and gear mechanism actuated by the advancing means to move the knife and cam in one direction, and yielding means for moving them in the other direction, a latch for holding the knives and cams in inactive position against the actuation of the yielding means, and means for releasing the latch consequent upon the completion of the advancing movement of the strip.

In testimony whereof, I hereunto affix my signature.

WILLIAM L. DEMING.